US009185387B2

(12) United States Patent
Campbell et al.

(10) Patent No.: US 9,185,387 B2
(45) Date of Patent: Nov. 10, 2015

(54) IMAGE BLUR BASED ON 3D DEPTH INFORMATION

(71) Applicant: Woodman Labs, Inc., San Mateo, CA (US)

(72) Inventors: Scott Patrick Campbell, Belmont, CA (US); Balineedu Chowdary Adsumilli, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 309 days.

(21) Appl. No.: 13/831,124

(22) Filed: Mar. 14, 2013

(65) Prior Publication Data
US 2014/0009585 A1    Jan. 9, 2014

Related U.S. Application Data

(60) Provisional application No. 61/667,888, filed on Jul. 3, 2012.

(51) Int. Cl.
H04N 13/02    (2006.01)
G06T 5/00    (2006.01)
H04N 5/262    (2006.01)
H04N 13/00    (2006.01)

(52) U.S. Cl.
CPC ............ H04N 13/0203 (2013.01); G06T 5/002 (2013.01); H04N 13/0271 (2013.01); H04N 5/262 (2013.01); H04N 2013/0081 (2013.01); H04N 2013/0088 (2013.01); H04N 2013/0096 (2013.01)

(58) Field of Classification Search
CPC .......... H04N 13/0048; H04N 13/0059; H04N 19/00751; H04N 21/2365
See application file for complete search history.

(56) References Cited

U.S. PATENT DOCUMENTS

2011/0137156 A1* 6/2011 Razzaque et al. ............. 600/424
2011/0170086 A1   7/2011 Oouchida
2011/0242098 A1* 10/2011 Tamaru ......................... 345/419

FOREIGN PATENT DOCUMENTS

| JP | 09181966 | * | 7/1997 |
| JP | H-09-181966 A | | 7/1997 |
| JP | 2005-252459 A | | 9/2005 |
| JP | 2006-053694 A | | 2/2006 |
| JP | 2006053694 | * | 2/2006 |
| JP | 2008-059121 A | | 3/2008 |
| JP | 2009-053748 A | | 3/2009 |
| JP | 2011-188004 A | | 9/2011 |
| JP | 2011188004 | * | 9/2011 |
| WO | WO 2006/001361 A1 | | 1/2006 |
| WO | WO 2012/086120 A1 | | 6/2012 |

OTHER PUBLICATIONS

Japanese Office Action for JP Application No. 2013-140131, Aug. 5, 2014, 6 pages.

* cited by examiner

Primary Examiner — Dave Czekaj
Assistant Examiner — Md Haque
(74) Attorney, Agent, or Firm — Fenwick & West LLP

(57) ABSTRACT

Blurring is simulated in post-processing for captured images. A 3D image is received from a 3D camera, and depth information in the 3D image is used to determine the relative distances of objects in the image. One object is chosen as the subject of the image, and an additional object in the image is identified. Image blur is applied to the identified additional object based on the distance between the 3D camera and the subject object, the distance between the subject object and the additional object, and a virtual focal length and virtual f-number.

23 Claims, 7 Drawing Sheets

IMAGE BLUR BASED ON 3D DEPTH INFORMATION

BACKGROUND

1. Field of Art

The disclosure generally relates to the field of optical systems, and more particularly to applying a blur filter to an image based on depth information from a 3D camera to simulate the effects of an optical system configured to capture a shallow depth-of-field image.

2. Description of the Related Art

Before the rise in popularity of digital cameras, most photographs and movies were captured by analog cameras on film. Since the sensors of such analog cameras are typically larger than image sensors in digital cameras, analog cameras required a larger lens and optical system to properly focus an object on the film. The larger optical systems associated with analog cameras could be configured to capture shallow depth-of-field images where only a portion of the image is in focus while the rest of the image is blurred. The blurring that occurs naturally with these larger optical systems was useful to camera operators because it could be used to draw a viewer's attention to a single in-focus portion of an image. For example, a camera could be configured so that an actor in the foreground of a scene would be in focus against a blurred background of trees.

Since the image sensors of digital cameras are not subject to the physical limitations of film, digital sensors have gradually decreased in size as new advancements are made in digital imaging technology. While the smaller size of digital image sensors and their associated optical systems has allowed for the development of digital cameras that are more portable and versatile than film cameras, the smaller sensor size also prevents digital cameras from capturing shallow depth-of-field images. In other words, it is difficult to configure the optical systems of small digital cameras to achieve the same artistic blurring that draws a viewer's attention to a single portion of an image.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1A:
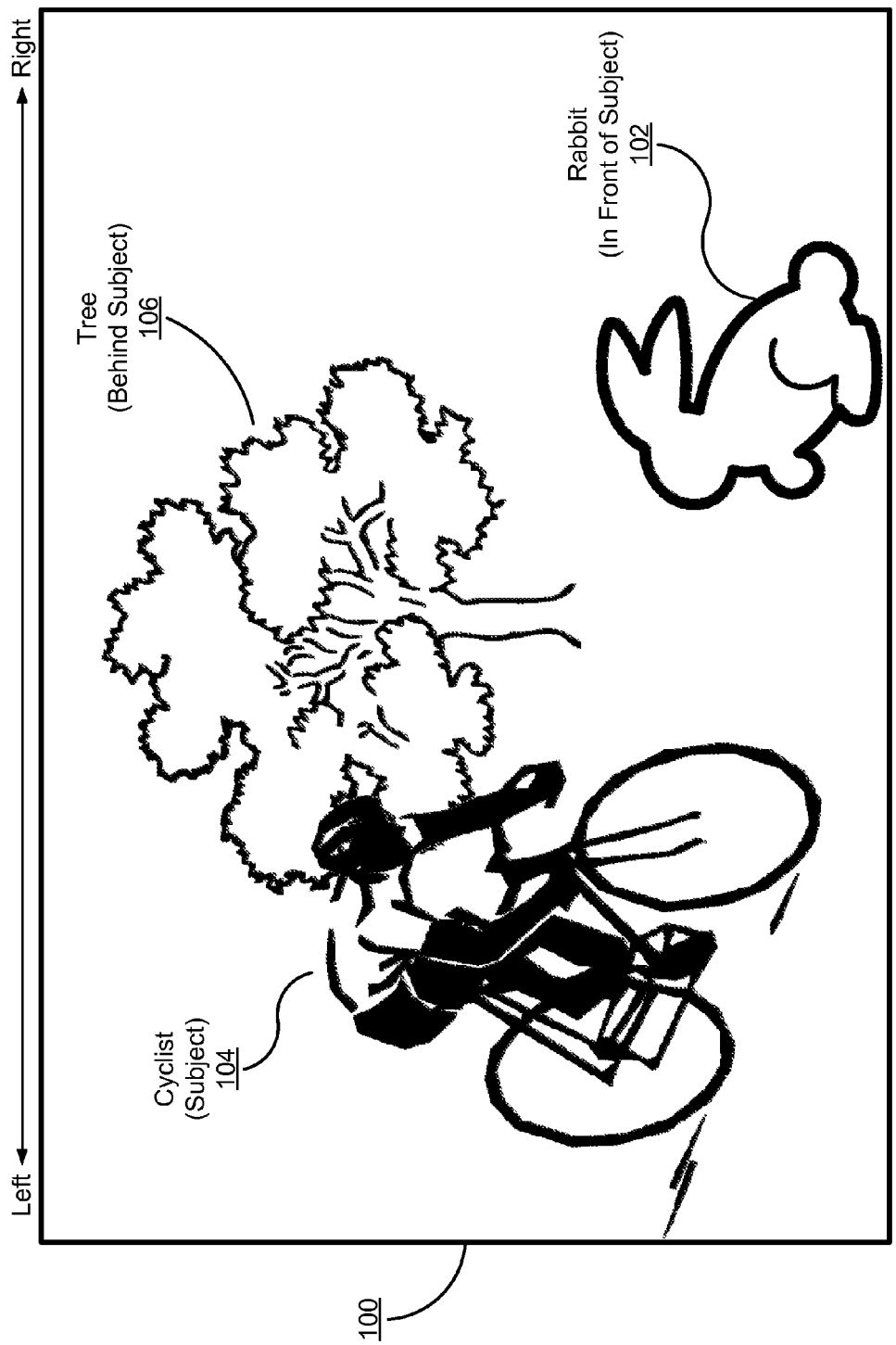
FIG. 1A illustrates an example 3D image that may be captured by a 3D camera, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The blurring that occurs when a large optical system is used to capture a shallow depth-of-field image can be simulated in post-processing with a cinematic blur module running on a computing system. The cinematic blur module analyzes depth information from a three-dimensional (3D) image captured by a 3D camera to determine the distances between the 3D camera and different objects in the 3D image. The cinematic blur module also identifies one of the objects in the image as the subject of the image. After determining the distance of the objects in the 3D image, a blur factor is calculated for each object based on the distance between the object and the subject, and the blur factor is used as an input parameter for a blur filter that is applied to the objects at each distance. Since the blur is applied in post-processing rather than in the optical system of the camera, a portable 3D camera with small image sensors and optical systems may be used to capture the original image.

The 3D camera may be embodied as two independent cameras that are oriented parallel to each other and pointed in the same direction. Since the two cameras are placed in slightly different positions, there is a distance offset between an object's positions in the two images that are captured by the cameras, and the distance offset can be used to determine the distance between the object and the 3D camera. In this case, the offset (known in the art as parallax information) represents the depth information for the object.

In one embodiment, the cinematic blur module receives the two images and uses the offset information to divide the image into a series of depth layers, with each layer containing the objects in a fixed distance interval from the camera (called a depth step). For example, one layer may contain objects between 2.4 and 2.5 meters from the camera. The cinematic blur module also uses a combination of pattern recognition and user input to identify one object as the subject of the image, and the layer containing the subject is designated as the subject layer.

After the subject layer is identified, a blur factor is calculated for each layer. The blur factor is based on the distance between the layer and the subject layer, the distance between the 3D camera and the subject layer, and a virtual f-number and focal length that are provided by the user. This beneficially allows a user to provide a virtual f-number and focal length that correspond to a large optical system configured to capture a shallow depth-of-field image. After a blur factor is calculated for each layer, an image blur is applied to each layer based on the blur factor, and the individual blurred image layers are then merged to create a single blurred image.

As used herein, a 3D image refers to an image that includes 3D depth information that can be used to determine the distance between the 3D camera and objects in the image. Similarly, a 3D camera is a camera that is capable of capturing 3D depth information. For example, a 3D camera may be embodied as two separated digital cameras oriented in the same direction, as described with reference to FIGS. 1B through 1D.

An object, as used herein, is a physical entity captured by a camera as part of an image. Objects may be positioned at different distances from the camera and/or in different positions within the frame (e.g., on the left side, in the middle, or on the right side). In addition, one object in an image may be chosen as the subject of the image. As used herein, the subject of an image is the object that is meant to remain in focus, and other objects in the image are additional objects. In some images, the subject may be chosen to attract a viewer's attention. For example, in an image depicting an actress in front of a background of trees, the actress would be the subject and the trees would be additional objects. Alternatively, the subject may be chosen purely for artistic reasons. For example, suppose the actress of the previous example is holding a flower in an outstretched hand while the rest of her body is behind her hand and farther away from the camera. A user may wish to draw attention to the actress by purposely choosing the flower, rather than the actress, as the subject. The user may subsequently configure the cinematic blur module to apply an image blur to the actress but not to the flower with the intention of drawing a viewer's attention to the blurred actress.

A blur factor, as used herein, is a parameter that defines the strength of a blur filter that is applied to an object in an image. The blur factor may be calculated with a blur function such as the blur function shown in FIG. 5. The blur function may be configured so that the subject and any additional objects at the same distance from the camera as the subject have a blur factor of 1, which means no image blur would be added. In this case, the blur function may additionally be configured so that objects at other distances have a blur factor greater than 1, which means image blur would be added to those objects to simulate the effects of a shallow depth-of-field image.

Using Parallax Information to Determine Object Distance

FIG. 1A is an example 3D image 100 that may be captured by a 3D camera, according to one embodiment. A cyclist 104 on the left side is the subject of the image 100 in the embodiment of FIG. 1A. The image 100 also contains two additional objects 102, 106. A rabbit 102 is in front of the cyclist 104 on the right side of the image 100, and a tree 106 is in the background behind the cyclist 104 in the middle of the image. Since the cyclist 104 is the subject of the image 100, a user may wish to simulate a shallow depth-of-field so that the cyclist 104 is in focus while the rabbit 102 and the tree 106 are blurred.

Figure 1B:
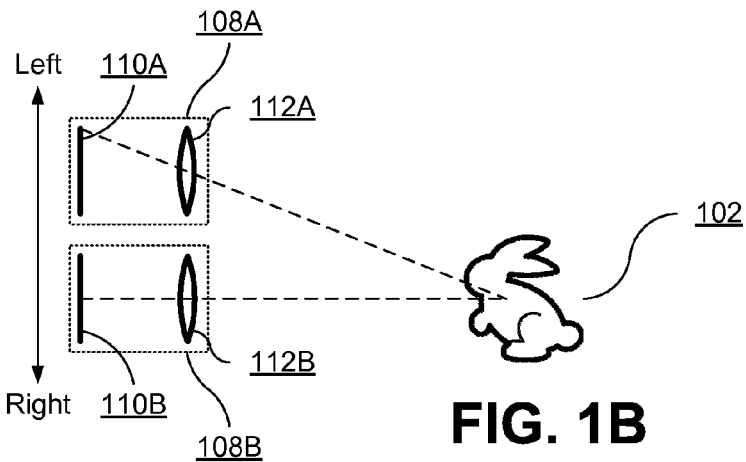
FIGS. 1B-1D are diagrams illustrating the distance offset that occurs on the sensor planes of a 3D camera when viewing each object shown in the image of FIG. 1A, according to one embodiment.
Figure 1C:
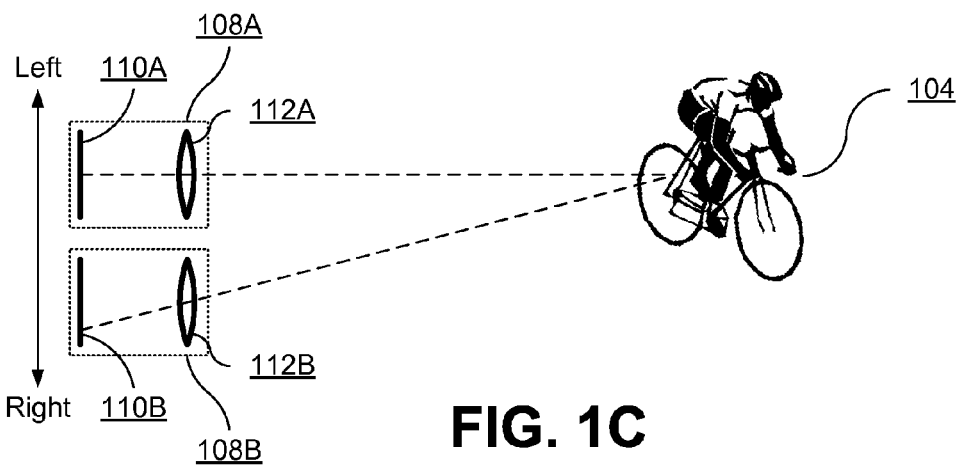
Figure 1D:
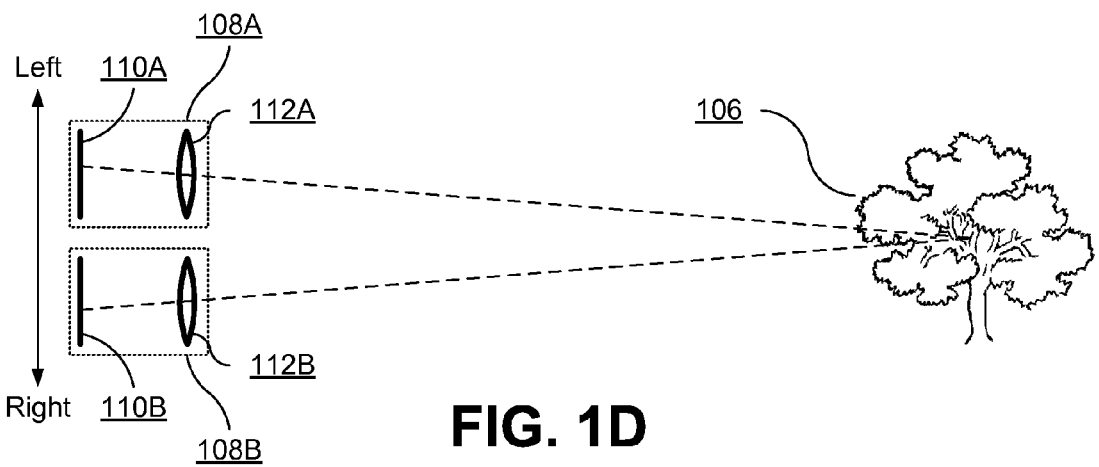

FIGS. 1B through 1D illustrate a relative lateral distance offset that occurs on the sensor planes 110A, 110B of a 3D camera when viewing the objects 102, 104, 106 in the example 3D image 100 of FIG. 1A, according to one embodiment. The offset represents 3D depth information that can subsequently be used to calculate the distance between the 3D camera and each object 102, 104, 106, and the combination of the two images taken by the two sensors 110A, 110B represents a single 3D image.

An example 3D camera is shown on the left side of each image. The example 3D camera shown in FIGS. 1B through 1D is embodied as two independent cameras (a left-hand camera 108A and a right-hand camera 108B), and each camera 108A, 108B contains its own image sensor 110A, 110B and its own lens 108A, 108B. Additional optical components such as additional lenses or an aperture are omitted from FIGS. 1B through 1D for the sake of clarity. In other embodiments, a 3D camera may include a single camera with two or more lenses (e.g., a stereo camera).

In the illustrated embodiment, the two cameras 112A, 112B are placed side-by-side at the same vertical height, and FIGS. 1B through 1D show a top-down view of the cameras 112A, 112B and the objects 102, 104, 106. In other embodiments, the cameras may 112A, 112B may be oriented differently. For example, the first camera 112A may be placed above the second camera 112B, or the two cameras 112A, 112B may be arranged diagonally. The orientation of the cameras 112A, 112B may also change with time. For example, if the two cameras 112A, 112B are mounted on the helmet of a snowboarder, the orientation of the cameras 112A, 112B would change rapidly as the snowboarder performs various stunts and tricks. The orientation of the cameras 112A, 112B does not affect their ability to accurately capture 3D depth information as long as the two cameras 112A, 112B remain pointed in the same direction and the distance between the cameras is known.

FIG. 1B illustrates the offset for the rabbit 102 shown in the image 100 of FIG. 1A. Since the rabbit 102 is on the right side of the image 100, it is directly in front of the right-hand camera 112B but to the right of the left-hand camera 112A. Thus, the rabbit 102 appears in the middle of the right-hand sensor 110B but on the left edge of the left-hand sensor 110A, which means the offset for the rabbit 102 spans half the width of the image sensors 110A, 110B.

FIG. 1C illustrates the offset for the cyclist 104 in the image 100 of FIG. 1A. The cyclist 104 is on the left side of the image 100, so it is in front of the left-hand camera 112A and to the left of the right-hand camera 112B. As a result, the cyclist 104 appears in the middle of the left-hand sensor 110A but on the right side of the right-hand sensor 110B. Since the cyclist 104 is farther away from the cameras 112A, 112B than the rabbit 102, the offset between the cyclist's positions on the left- and right-hand sensors 110A, 110B is smaller than the offset for the rabbit 102.

FIG. 1D illustrates the offset for the tree 106. The tree 106 is in the center of the image 100, so it appears slightly left of center on the left-hand sensor 110A and slightly right of center on the right-hand sensor 110B. Since the tree is farther away from the cameras 112A, 112B than the rabbit 102 and the cyclist 104, the offset between the tree's positions on the two image sensors 110A, 110B is smaller than the offsets for the two closer objects 102, 104.

The example described with reference to FIGS. 1A through 1D is merely illustrative, and certain dimensions are exaggerated in the corresponding drawings to emphasize the distance offsets for the three objects 102, 104, 106. In most situations, the distance between the two cameras 108A, 108B is much smaller than the sizes the real-life objects being captured in the 3D image. However, the general principles described herein regarding the relationship between an object's distance and its distance offset on the image sensors are applicable regardless of the relative sizes of the 3D camera system and the objects being captured.

In general, the offset between an object's positions on the sensors of a 3D camera decreases as distance between the camera and the object increases, and the offset can be used to determine the distance between the camera and the object. This distance is called an object distance. Thus, the offset (known in the art as parallax information) is one example of 3D depth information that may be collected by a 3D camera system. The process of using parallax information to determine an object distance is called ranging and is described in detail with reference to the distance calculator 304 of FIG. 3. A ranging process is also described in U.S. Published Patent Application No. 2011/0170086 entitled "Ranging Device and Ranging Module and Image-Capturing Device using the Ranging Device or the Ranging Module," which is hereby incorporated by reference in its entirety. It should be noted that any other suitable methods of determining distances between objects in an image, and between objects and a camera may be used (e.g., focus distance, laser ranging, etc), though the remainder of the description of object distances and offsets herein will be limited to embodiments utilizing parallax information for simplicity.

Example Computing Environment

Figure 2:
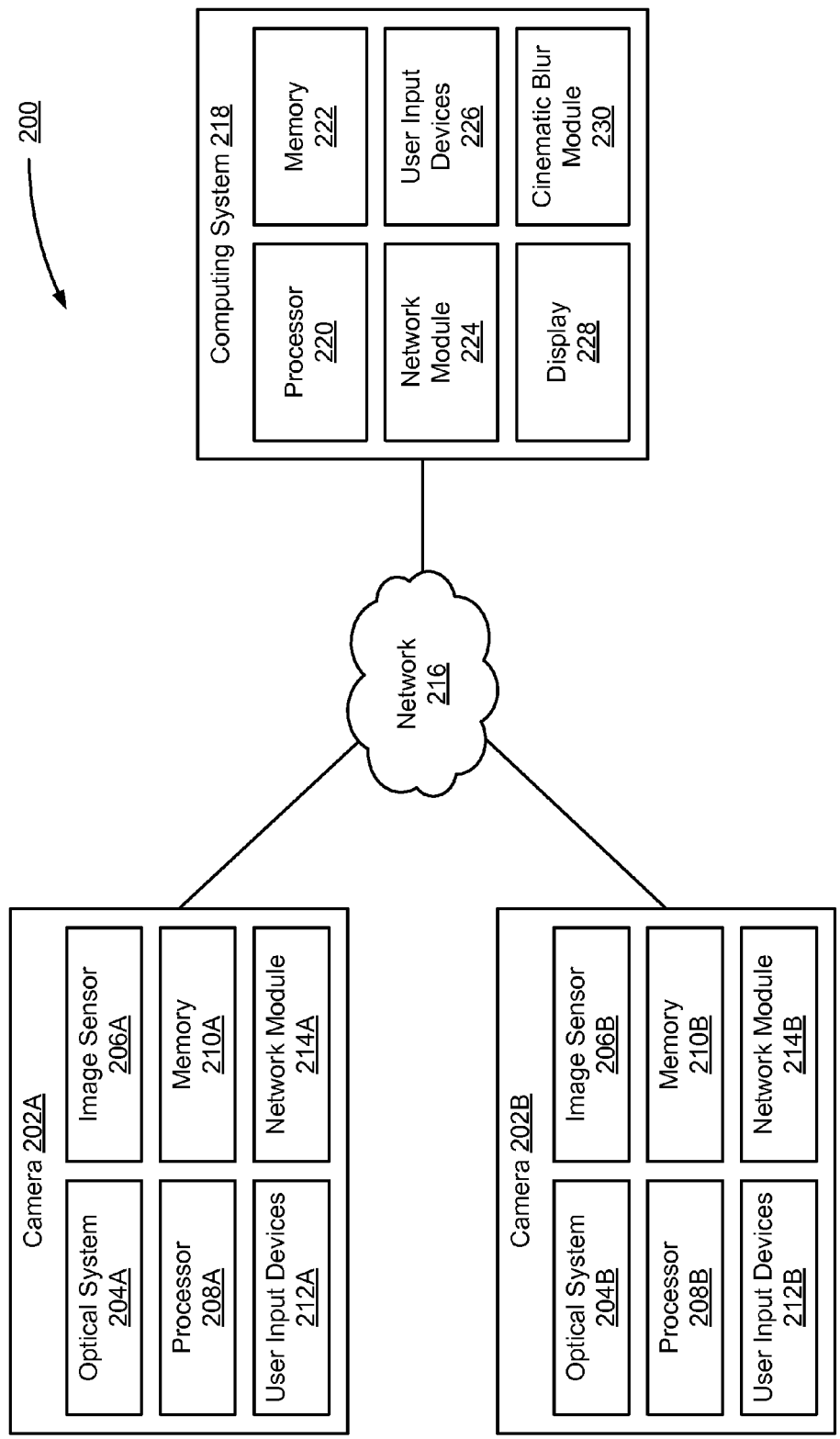
FIG. 2 is a network diagram illustrating a system for applying a cinematic blur a 3D image, according to one embodiment.

FIG. 2 is a network diagram illustrating a system 200 for applying a cinematic blur to a 3D image 100, according to one embodiment. The system 200 includes two cameras 202A, 202B, a network 216, and a computing system 218. As described with reference to FIG. 1B through 1D, the two cameras 202A, 202B are used to capture parallax information for objects in an image by capturing the image from two different angles. The cameras 202A, 202B are arranged parallel to each other so that they are separated by a separation distance and pointed in the same direction. To maintain the parallel arrangement of the cameras 202A, 202B, they may be placed in a rigid mechanical housing to prevent them from moving relative to each other.

Each camera 202 includes an optical system 204, an image sensor 206, a processor 208, memory 210, one or more user input devices 212, and a network module 214. Each camera 202 may also include additional components, such as a display, artificial illumination (e.g. a flash), or a tripod mount, but these components are not critical to the blurring function of the system 200 and are omitted from FIG. 2 for the sake of brevity.

The optical system 204 contains optical components for focusing an image onto the image sensor. The optical components may include, for example, an aperture to vary the diameter of an entrance pupil and one or more movable lenses that change the focal length. The entrance pupil diameter, focal length, and other characteristics of the optical system 204 may be controlled by electronic signals from other components of the camera or by a user's physical interactions with mechanical controls on the optical system.

In general, a configuration of any optical system, including the optical system 204 of the cameras 202A, 202B, may be characterized by two parameters: a focal length and an f-number. A focal length, as used above and in the rest of this description, is the distance between a lens and the focal point of the lens for collimated rays (i.e., rays from an object that is essentially infinitely far away from the lens). An f-number, as used herein, is the ratio between the focal length and the diameter of the entrance pupil. In other words, f#=f/D, where f is the focal length, D is the diameter of the entrance pupil, and f# is the f-number. It can be seen in the above equation that the f-number is inversely proportional to the diameter of the entrance pupil. In other words, smaller f-numbers correspond to larger entrance pupils. As known in the art, the depth of field captured by a camera can be made shallower by reducing the f-number (i.e., increasing the size of the entrance pupil) of the camera's optical system or by increasing the focal length of the lens.

The optical system 204 has mechanical limitations that constrain its range of focal lengths and f-numbers. For example, the axial length of the optical system 204 may establish a maximum and minimum value for the focal length of the optical system 204. Similarly, the design of the aperture may establish a maximum and minimum entrance pupil diameter, which would constrain the optical system's range of f-numbers. In addition, the field of view of the cameras 202 depend on the focal length of the optical system 204 and the width of the image sensor 206.

The image sensor 206 is an electronic component that converts the optical image from the optical system 204 into an electronic image. Since image blur is added in post-processing, there may be reduced need for a large optical system 204 and image sensor 206 that are capable of capturing shallow depth-of-field images. Thus, a pair of small and portable cameras 202A, 202B containing miniaturized optical systems 204 and image sensors 206 may be used to capture the parallax information that is used by the cinematic blur module 230.

The processor 208 is a hardware device that executes computer-readable instructions stored in the memory 210. The processor 208 controls other components of the camera based on the instructions that are executed. For example, the processor 208 may send electronic control signals to the optical system 204 or use the network module 214 to send data over the network 216 to the computing system 218 or some other connected device.

The memory 210 is a non-transitory storage medium that can be read by the processor 208. The memory 210 may contain a combination of volatile memory (e.g., RAM) and non-volatile memory (e.g., flash memory, hard disk, etc) and may be used to store, among other things, image data captured by the image sensor 208 and computer-readable instructions to be executed by the processor 208.

The user input devices 212 allow a user to interact with the electronic functions of the camera. The user input devices 212 may include any combination of physical or electronic input devices, such as buttons, dials, or a touchscreen. Examples of user input devices 212 include exterior buttons to start recording video or capture a still image, a touchscreen with tap-to-focus capabilities, and a dial/button combination for navigating a menu hierarchy of the camera 202. In addition, the user input devices 212 may include remote user input devices, such as remote controls that wirelessly communicate with the cameras 202.

The network module 214 sends and receives data over the network 216 to communicate with other devices, such as the computing system 218 or other cameras 202. In particular, the network module 214 may be used transfer image data saved in the memory 210 to the computing system 218 to be processed. Alternatively, the network module 214 may be configured to send image data captured by the image sensor 206 to the computing system in real-time (i.e., sending the image data as soon as it is captured).

In other embodiments, the system 200 may contain additional or fewer cameras 202. For example, a third camera may be added in a position that allows the third camera to view blind spots of the other two cameras. Alternatively, a single camera 202 containing two or more optical systems 204 and image sensors 206 (e.g., a stereo camera) may be used to capture the parallax information that is used to determine the distances of objects in captured images. In this case, the housing of the single camera 202 would be configured so that the two optical systems 204 and image sensors 206 are oriented in parallel and pointed in the same direction.

The network 206 allows connected devices, including the cameras 202 and the computing system 218, to exchange data with each other. The network 206 may contain a combination of wired or wireless technology and make use of various connection standards and protocols, such as USB, IEEE 1394, Ethernet, 802.11, or Bluetooth. The network 206 may also use the internet to exchange data between connected devices and may contain link technologies such as CDMA, 3G, 4G, or digital subscriber line (DSL). In an alternative embodiment, the network 216 and the network modules 214, 224 are omitted and image data is transferred from the cameras 202 to the computing system 218 by physically transferring a non-transitory computer-readable medium (e.g., a removable flash memory card) from the cameras 202 to the computer 218.

FIG. 2 also contains a detailed view of the computing system 218 that receives and processes image data from the cameras 202. The computing system 218 contains, among other components, a processor 220, memory 222, a network module 224, user input devices 226, a display 228, and a cinematic blur module 230. As a whole, the computing system 218 may be any electronic device that contains these components 220, 222, 224, 226, 228, 230, such as a desktop computer, a portable computer (i.e., a laptop), a tablet computer, a smartphone, or even another camera.

Similar to the processor 208 of the cameras 202, the processor 220 in the computing system is a hardware device that executes computer-readable instructions. Although only one processor 220 is pictured, the computing system 218 may contain multiple processors 220 dedicated to different tasks (e.g., a central processing unit and a separate graphics processor) or multiple processors 220 operating in parallel to perform the same task.

The memory 222 is a non-transitory storage medium that can be read by the processor 220. Similar to the memory 210 of the cameras 202, the memory 222 of the computing system 218 may include a combination of volatile memory (e.g., RAM) and non-volatile memory (e.g., a solid state drive, hard disk drive, optical disc, removable flash memory, etc).

The network module 224 communicates over the network 216 to other connected devices, including the cameras 202. The network module 224 may be used to receive image data from the cameras 202. Upon receiving the image data, the network module 224 may store the image data on the memory 222 to be accessed later, or the module 224 may send the data directly to the cinematic blur module 230. The user input devices 226 receive input from a user of the computing system 218. User input devices 226 may include, for example, a keyboard, mouse, or touchscreen. The display 228 is a visual output device (e.g., a monitor) that shows information to the user. In particular, the display 228 may display the images received from the cameras 202 and the blurred images generated by the cinematic blur module 230.

The cinematic blur module 230 receives 3D image data from the memory 222 or the network module 224 and generates a partially blurred image that approximates the effect of a large optical system configured to capture the image with a shallow depth-of-field. At a high level, the cinematic blur module uses 3D depth information (e.g., parallax information) to determine the distances between the subject and additional objects in the image (called "defocus distances") and applies a blur filter to the additional objects based on the associated defocus distances. The functionality of the cinematic blur module 230 is described in further detail with reference to FIG. 3. Although the cinematic blur module 230 is shown as a separate entity within the computing system 218, the module 230 may be embodied as computer-readable instructions stored on the memory, as a separate hardware module, as a hardware module embedded in the processor, or any combination thereof.

Figure 3:
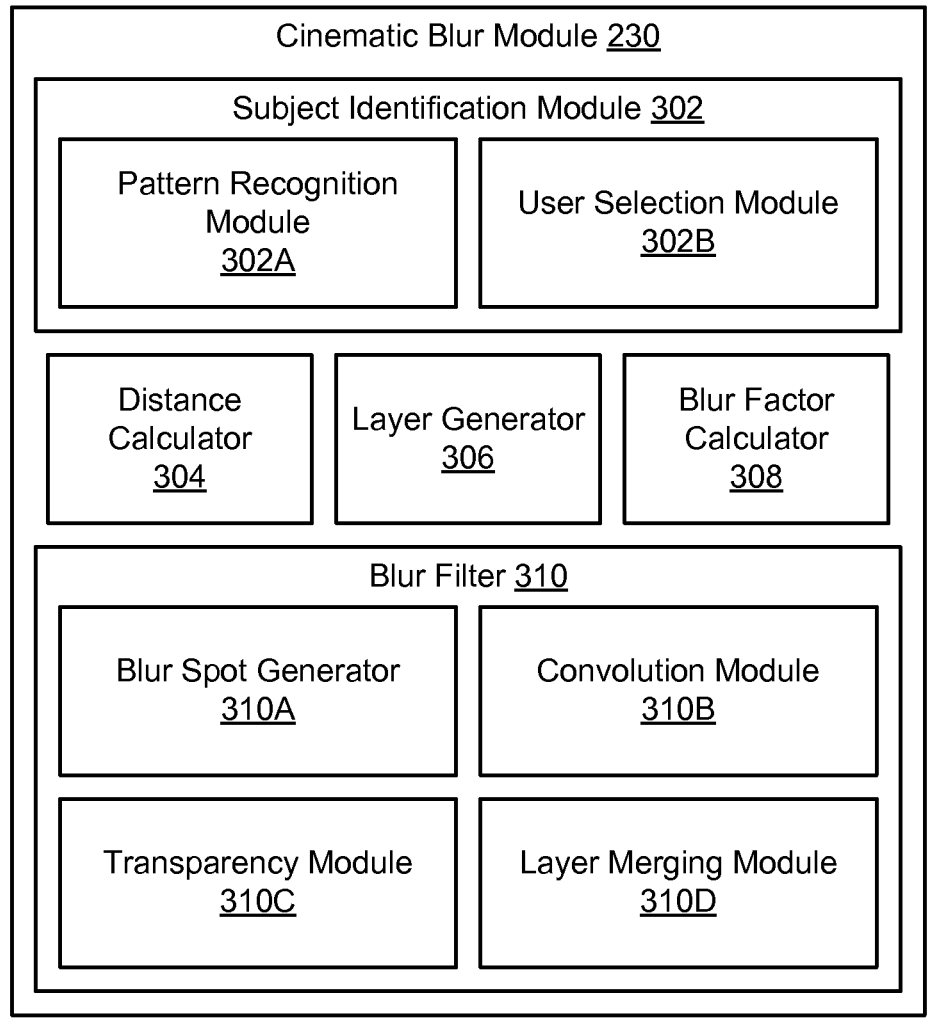
FIG. 3 is a high-level block diagram illustrating a detailed view of the cinematic blur module of FIG. 2, according to one embodiment.

FIG. 3 is a high-level block diagram illustrating a detailed view of the cinematic blur module 230 of FIG. 2, according to one embodiment. The cinematic blur module 230 contains a subject identification module 302, a distance calculator 304, a layer generator 306, a blur factor calculator 308, and a blur filter 310. The subject identification module 302 contains a pattern recognition module 302A and a user selection module 302B, and the blur filter 310 contains a blur spot generator 310A, a convolution module 310B, a transparency module 310C, and a layer merging module 310D.

The subject identification module 302 receives a 3D image and uses various methods to identify one object in the image as the subject of the image. The pattern recognition module 302A uses pattern recognition algorithms to identify objects that may be of interest to a viewer. For example, the pattern recognition module 302A may use a facial recognition algorithm to identify the facial features of the cyclist 104 in the example image 100 of FIG. 1A.

The user selection module 302B allows the user to manually select an object as the subject of the image. In one embodiment, the user selection module 302B displays the image on the display 228 and allows the user to use the user input devices 226 to identify an object in the displayed image as the subject. For example, if the pattern recognition module 302A is unable recognize the facial features of the cyclist 104, the user may use the user input devices 226 to select the cyclist 104. The user selection module 302B processes the user input and designates the cyclist 104 as the subject.

The pattern recognition module 302A and the user selection module 302B may operate in conjunction to identify the subject in a sequence of 3D images (e.g., the frames of a 3D video). For example, the user selection module 302B may be used to manually select the subject in certain frames of a video (e.g., at every key frame, at fixed one-second intervals, etc) while the pattern recognition 302A is used to identify a pattern similar to the user-selected subject in the video frames immediately following each frame in which the subject was selected by the user.

Alternatively, one of the modules 302A, 302B may be omitted and the subject identification module 302 may rely exclusively on a single module to perform the subject identification functions of the cinematic blur module 230. For example, the subject identification module 302 may be configured so that the pattern recognition module 302A is used for every image. This configuration would be able to perform the subject identification process for a large number of images without any significant user input. Alternatively, the user selection module 302B may be used to manually identify the subject of each image. This alternative configuration may be beneficial if the user has only captured a small number of images or if the cinematic blur module 230 is operating on a computing system 218 with limited computing resources. In addition, the subject identification module 302 may also include other modules either in addition to or in place of the pattern recognition module 302A and the user selection module 302B.

The distance calculator 304 analyzes the 3D depth information in a 3D image to determine the distance between the 3D camera and objects in the 3D image (i.e., the object distance). As described with reference to FIGS. 1A through 1D, the process of analyzing 3D depth information to determine an object distance is called "ranging". In one embodiment, the distance calculator 304 receives two images from the two cameras 202A, 202B and ranges the image by analyzing the parallax information in the images. In particular, the distance calculator 304 may use the equation V=(σ·f)/(s·d), where σ is the separation distance between the two cameras 202A, 202B, f is the focal length of the optical systems 204A, 204B of the cameras, s is the offset (for instance, in pixels) between the positions of an object on the two image sensors 206A, 206B, d is the width of one pixel on the image sensors 206A, 206B, and V is the distance between the 3D camera and the object being ranged.

After the subject identification module 302 identifies the subject of an image, the distance calculator 304 may also be used to determine a distance between the subject and each additional object. This distance is called a "defocus distance," and may be calculated by subtracting the subject distance (i.e., the distance between the 3D camera and the subject, or the object distance of the object that is identified as the subject) from the object distance of the additional object. The defocus distance is negative for additional objects in front of the subject (i.e., between the 3D camera and the subject) and positive for additional objects behind the subject (i.e., farther from the 3D camera than the subject). The defocus distance for an additional object is used in the blur factor calculator 308 to calculate the blur factor for the additional object.

The layer generator 306 divides the 3D image into a series of depth steps and generates a layer that contains the objects in each depth step. The layer generator 306 uses object distances generated by the distance calculator 304 to determine the contents of each depth step. For example, the layer generator 306 may assign every object with an object distance between 2.4 and 2.5 meters to a first layer, may assign objects with an object distance between 2.5 and 2.6 meters to a second layer, and so forth. In this case, the first layer corresponds to a depth step of 2.4-2.5 meters, and the second layer corresponds to a depth step of 2.5-2.6 meters. To generate a layer, the layer generator 306 begins with a transparent backdrop and places the objects from the corresponding depth step on top of the transparent backdrop. Thus, the region of the layer that contains the objects is opaque while the region of the layer that does not contain any objects remains transparent.

After the layers are generated, the blur factor calculator 308 and blur filter 310 operate in conjunction to apply an image blur to each layer. The layer generator 306 also identifies the layer corresponding to the subject as the subject layer, and the blur factor calculator 308 and blur filter 310 may be configured so that they do not apply image blur to the subject layer.

The layer generator 306 may be configured so that the size of the depth steps for the layers varies depending on the content of the 3D image. For example, suppose the rabbit 102 in the example image 100 of FIG. 1A has an object distance of 2.5 meters and is surrounded by grass. The depth steps that contain the rabbit 102 may be smaller (e.g., 2.45 to 2.50 meters and 2.50 to 2.55 meters) while the depth steps for the surrounding grass may be larger (e.g., 2.35 to 2.45 meters and 2.55 to 2.65 meters). Varying the size of the depth steps can lead to a reduction in resource use while still generating a realistic blur effect for objects that are likely to draw a viewer's attention.

Additionally, the layer generator 306 may also omit layers that do not contain any objects (e.g., layers that are completely transparent). For example, suppose the cameras 202A, 202B are mounted on the helmet of a first skydiver, and the first skydiver captures an image consisting of a second skydiver in the foreground and an airplane in the background. If the second skydiver is chosen as the subject, then the airplane would be the only additional object in the image. In this case, the depth steps for the empty sky between the camera and the second skydiver and between the second skydiver and the airplane would be completely empty, so the corresponding layers would not contain any meaningful image data. In this case, the layer generator 306 may simply omit the corresponding layers to reduce the resource use of the blur factor calculator 308 and the blur filter 310.

The blur factor calculator 308 calculates a blur factor for each image layer generated by the layer generator 306. The blur factor determines the strength of the blur filter that will be applied to the image layer. In one embodiment, the blur factor for an image layer is given by the equation:

$$\beta = \left(1 + \left[\frac{-4 \cdot f^2 \cdot \Delta V}{5 \cdot (V \cdot \Delta V + V^2) \cdot (f\#)^2}\right]^2\right)^{\frac{1}{2}}.$$

In this equation, f is the focal length and f# is the f-number of a virtual optical system (not the optical systems 204A, 204B of the cameras 202A, 202B), V is the subject distance, ΔV is the defocus distance of the depth step associated with the image layer, and β is the blur factor. The focal length and f-number of the virtual optical system may be chosen by the user, and this beneficially allows the user to choose a focal length and f-number that yield an image with a chosen depth-of-field. The subject distance and defocus distance are calculated by the distance calculator 304. This equation models the behavior of an optical system. In other words, the blur factor represents the size of the blur spot that would appear on an image sensor when a point source placed at the defocus distance is viewed through a virtual optical system with the specified focal length and f-number. Thus, this equation can beneficially be used to simulate the effects of a virtual optical system that is not constrained by the same focal length and f-number limitations as the optical systems 204A, 204B of the cameras 202A, 202B.

The blur filter 310 receives an image layer from the layer generator 306 and applies a blur filter to the image layer based on the layer's blur factor. The blur spot generator 310A uses the blur factor to generate a blur spot. As described above with reference to the blur factor calculator 308, the blur spot is the portion of the image that would appear on the image sensors 206A, 206B if an optical system configured to have the user's specified focal length and f-number were used to view a point source occupying the portion of the image and located at the defocus distance corresponding to the image layer. The blur spot generator 310A may be configured to generate an impulse function if the blur factor has a value of 1. In this case, a blur factor of 1 would not cause the blur filter to add any image blur to the layer.

In one embodiment, the blur spot generator 310A generates a Gaussian function that approximates the shape of an Airy disc, as known in the art. In another embodiment, the blur spot generator 310A generates a blur spot consisting of a uniform disc. In yet another embodiment, the blur spot generator 310A may be configured to generate a non-circular shape, such as a regular pentagon, to simulate the effect of a non-circular aperture. However, the diameter of the blur spot is directly proportional to the value of the blur factor regardless of the blur spot's shape. In other words, increasing the blur factor should increase the diameter of the blur spot, regardless of whether the blur spot is a Gaussian function, a uniform disc, or a pentagon.

The convolution module 310B convolves the blur spot with the image layer to produce a blurred image layer. As described above, the image layer includes a region containing objects and a transparent region that does not contain any objects. Accordingly, the blurred image layer includes a blurred region containing blurred objects and a region that remains transparent. The convolution operation may cause image blur to spread into the transparent region of the image layer. Thus, the blurred region in the blurred image layer may be slightly larger in area than the region in the unblurred image layer that contains the objects, and the transparent region in the blurred image layer may be slightly smaller in area than the transparent region in the unblurred image layer.

If the blur spot is an impulse function (e.g., if the blur factor was 1), then the convolution operation does not add any blur to the image layer. To reduce the resource load on the computing system 218, the convolution module 310B may be configured so that it does not perform the convolution operation when the blur spot is an impulse function. To further reduce the resource load, the convolution module 310B may also be configured so that it only convolves the blur spot with the region of the image layer that contains objects. For example, if one image layer for a 3D image consists solely of a skydiver, then the convolution module 310B may only convolve the blur spot with the region of the image layer that contains the skydiver and skip the transparent region of the layer. The two-dimensional convolution operation performed by the convolution module 310B is well-known in the art and a detailed description of the convolution operation is omitted for the sake of brevity.

The transparency module 310C varies the transparency of the blurred image layer to prevent a blurred object in the blurred image layer from blocking objects in other image layers. To generate a realistic image blur, the transparency module 310C may be configured to increase the transparency for an image layer in proportion to the size of the blur spot.

In one embodiment, the blur spot generator 310A generates opaque blur spots and the transparency module 310C applies a transparency function to the blurred image layers generated by the convolution module 310B. Since the blur spots are opaque, each blurred image layer includes opaque regions that contain blurred objects and transparent regions that do not contain any objects. In this embodiment, the transparency module 310C applies the transparency function to the boundary areas between opaque regions and adjacent transparent regions to simulate a realistic image blur. For example, the transparency function can apply a large amount of transparency at the edge of an opaque region and reduce the level of transparency applied to points that are farther from the edge of the opaque region.

In an alternative embodiment, the transparency module 310C calculates and applies a transparency to the blur spot before the blur spot is convolved with the image layer. For example, if the blur spot is a Gaussian function, the transparency module 310C may be configured to make the blur spot opaque in the center and increasingly transparent at distances farther from the center.

The layer merging module 310D receives the blurred image layer after the appropriate transparency has been applied and merges the layer with the other blurred layers of the image. This generates a single image that has the same blur pattern as an image that was taken with a virtual optical system configured to have the user's specified focal length and f-number.

In an alternative embodiment, all or part of the cinematic blur module may be implemented on the cameras 202A, 202B instead of in a separate computing system 218. For example, a corresponding module on the cameras 202A, 202B may be configured to perform the functions of the subject identification module 302, distance calculator 304, and layer generator, and the cinematic blur module 230 may immediately begin calculating blur factors and applying blur filters to each layer upon receiving the image data from the cameras. If the entire cinematic blur module 230 is implemented on the cameras 202A, 202B, then the computing system 218 may be omitted from the system 200 shown in FIG. 2. However, it may be preferable to save the un-blurred image data captured by the cameras 202A, 202B and perform the blurring process in post-processing because image information is lost during the blurring process. In other words, if the cameras 202A, 202B apply blur filters to images immediately after capturing them and before storing the original images, then there is no way to restore the original un-blurred images to use for other purposes.

Blur Factor Calculation

Figure 4:
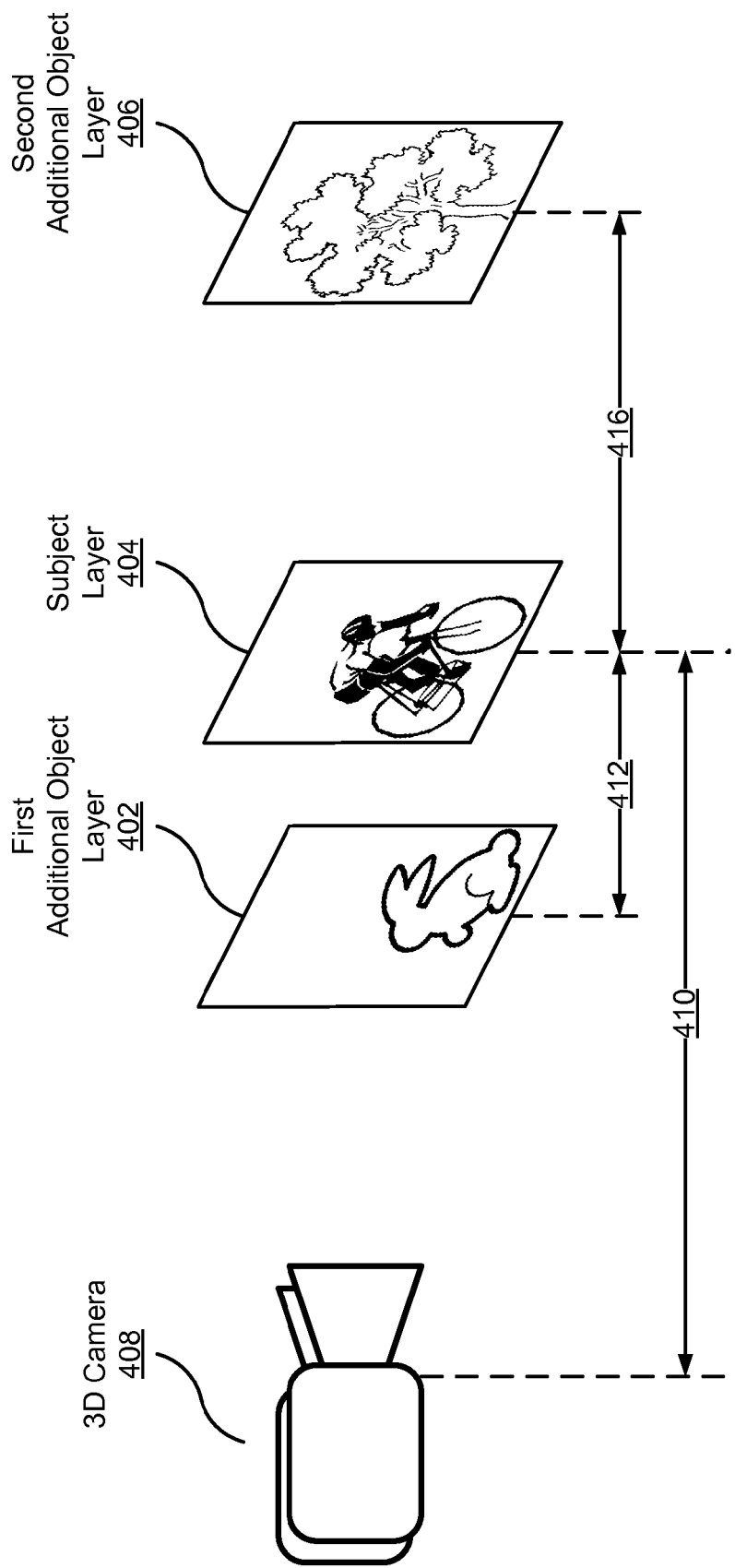
FIG. 4 is a diagram illustrating distances between the cameras, the subject, and additional objects, according to one embodiment.

FIG. 4 is a diagram illustrating distances between the 3D camera 408, the subject 404, and additional objects 402, 406, according to one embodiment. The distances shown in FIG. 4 are used to calculate the blur factors for the image layers corresponding to each object 402, 404, 406. A first distance 410 (i.e., the subject distance) separates the cameras 408 from the layer corresponding to the subject 404. In addition, there is a second distance 412 (i.e., a defocus distance) separating the subject layer 404 from a first additional object layer 402 and a third distance 416 (i.e., another defocus distance) between the subject layer 404 and a second additional object layer 406.

Although each of the objects in FIG. 4 is shown as part of a single layer, it is also possible for one or more of the objects to occupy multiple layers. For example, if the rabbit has a depth of 10 cm, it may occupy a first layer corresponding to a depth step of 2.45-2.50 m and a second layer corresponding to 2.50-2.55 m. In this case, there is a different defocus distance and a different blur factor for each layer occupied by the object. In addition, there may also be image layers between the layers 402, 404, 406 that contain grass, bushes, or other minor objects in between the three objects that are shown, but these additional layers are omitted from FIG. 4 for the sake of brevity.

Figure 5:
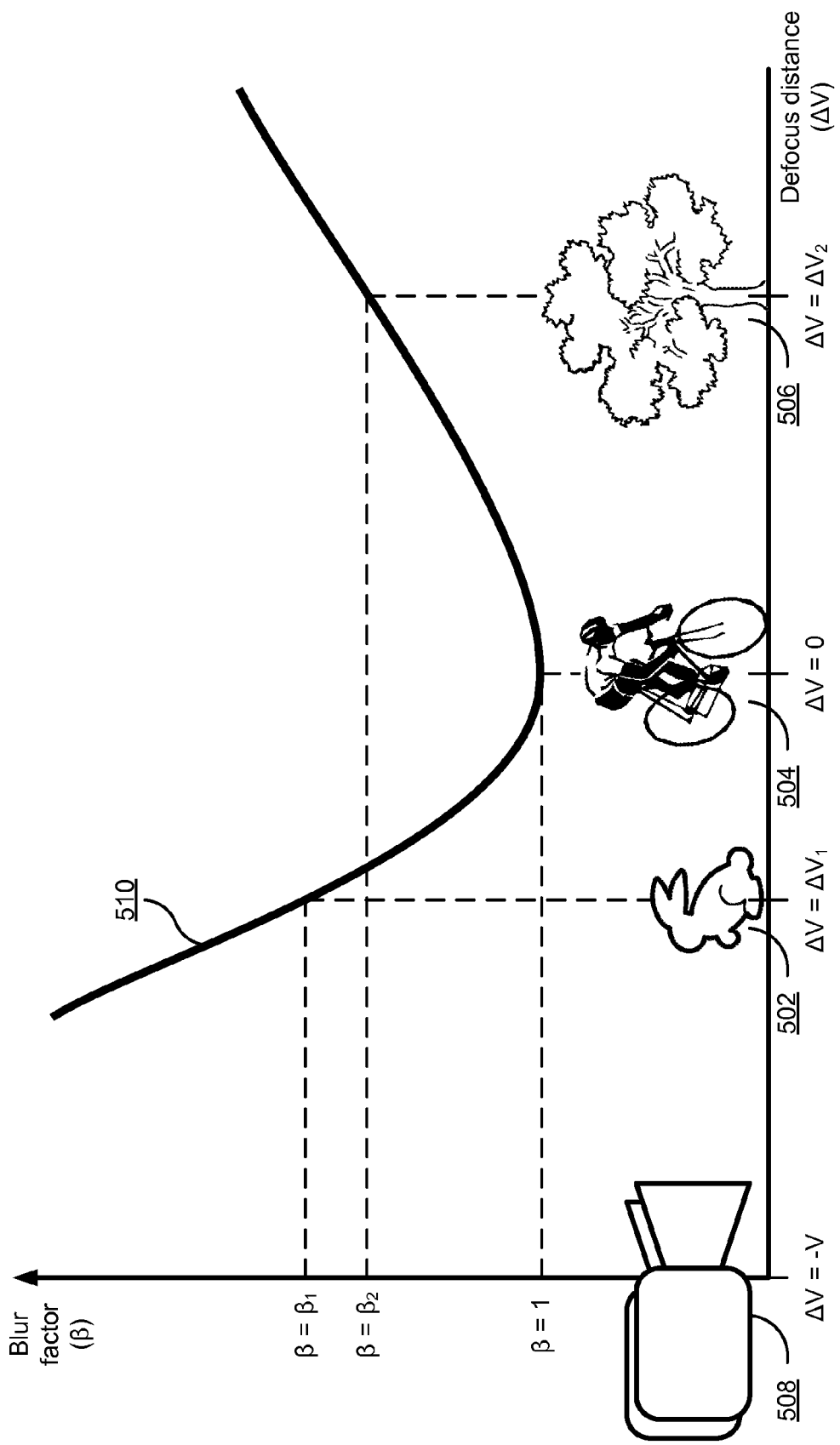
FIG. 5 is a plot of a blur function that illustrates the value of the blur factor at different distances from the subject, according to one embodiment.

FIG. 5 is a plot of a blur function that illustrates the value of the blur factor for objects 502, 506 at the defocus distances shown in FIG. 4, according to one embodiment. The blur function 510 receives a focal length (f), f-number (f#), and subject distance (V) as parameters, and the function 510 is used to generate blur factors (β) for image layers associated with different defocus distances (ΔV). As described with reference to FIG. 3, one beneficial example of the blur function is the equation:

$$\beta = \left(1 + \left[\frac{-4 \cdot f^2 \cdot \Delta V}{5 \cdot (V \cdot \Delta V + V^2) \cdot (f\#)^2}\right]^2\right)^{\frac{1}{2}}.$$

The function 510 shown in FIG. 5 is a plot of this equation. It can be seen in FIG. 5 that this blur function 510 has a value of β=1 at a defocus distance of ΔV=0, which corresponds to the position of the cyclist 504. Thus, the blur filter 310 does not apply any blur to the image layer that contains the cyclist 504. Meanwhile, the rabbit 502 is at a non-zero defocus distance ΔV=ΔV$_1$, where the blur function has a value of β=β$_1$, and the tree is at a defocus distance ΔV=ΔV$_2$ with a corresponding blur factor of β=β$_2$. Since the blur factors for the image layers corresponding to the rabbit 502 and the tree 506 are both greater than 1, the blur filter 510 applies an image blur to these two layers.

The blur filter 510 may also apply a transparency to the image layers corresponding to the rabbit 502 and the tree 506. As described with reference to FIG. 3, applying a transparency is beneficial because it prevents a blurred object from obstructing objects that are farther from the 3D camera 508. For example, the blur filter 510 may apply a transparency to the rabbit 502 to prevent the blurred image of the rabbit 502 from obstructing the cyclist 504 or the tree 506. In one embodiment, the level of transparency is proportional to the blur factor, so objects in image layers associated with larger blur factors have more transparent edges.

It can also be seen that the blur function in the embodiment of FIG. 5 increases with a steeper slope when moving toward the camera 508 as compared to moving away from the camera 508. Thus, the rabbit 502 has a higher blur factor than the tree 506 even though the tree 506 is at a larger defocus distance. It can be shown that the example blur function 510 that is shown in FIG. 5 and defined by the above equation has a vertical asymptote at the defocus distance $\Delta V=-V$ corresponding to the camera 508.

Referring back to FIG. 4, the image layers 402, 404, 406 and any un-pictured layers are merged into a single blurred image after the blur filter and transparency are applied to each layer. In one embodiment, all the blurred image layers may be merged together at once after they have all been generated. Alternatively, the blurred image layers may be merged one at a time. For example, the cinematic blur module 230 may merge the subject layer 404 with a blurred version of the first additional image layer 402, apply image blur to the second additional object layer 406, and then merge the blurred second layer 406 with the first two layers.

Using 3D Depth Information to Apply Cinematic Image Blur

Figure 6:
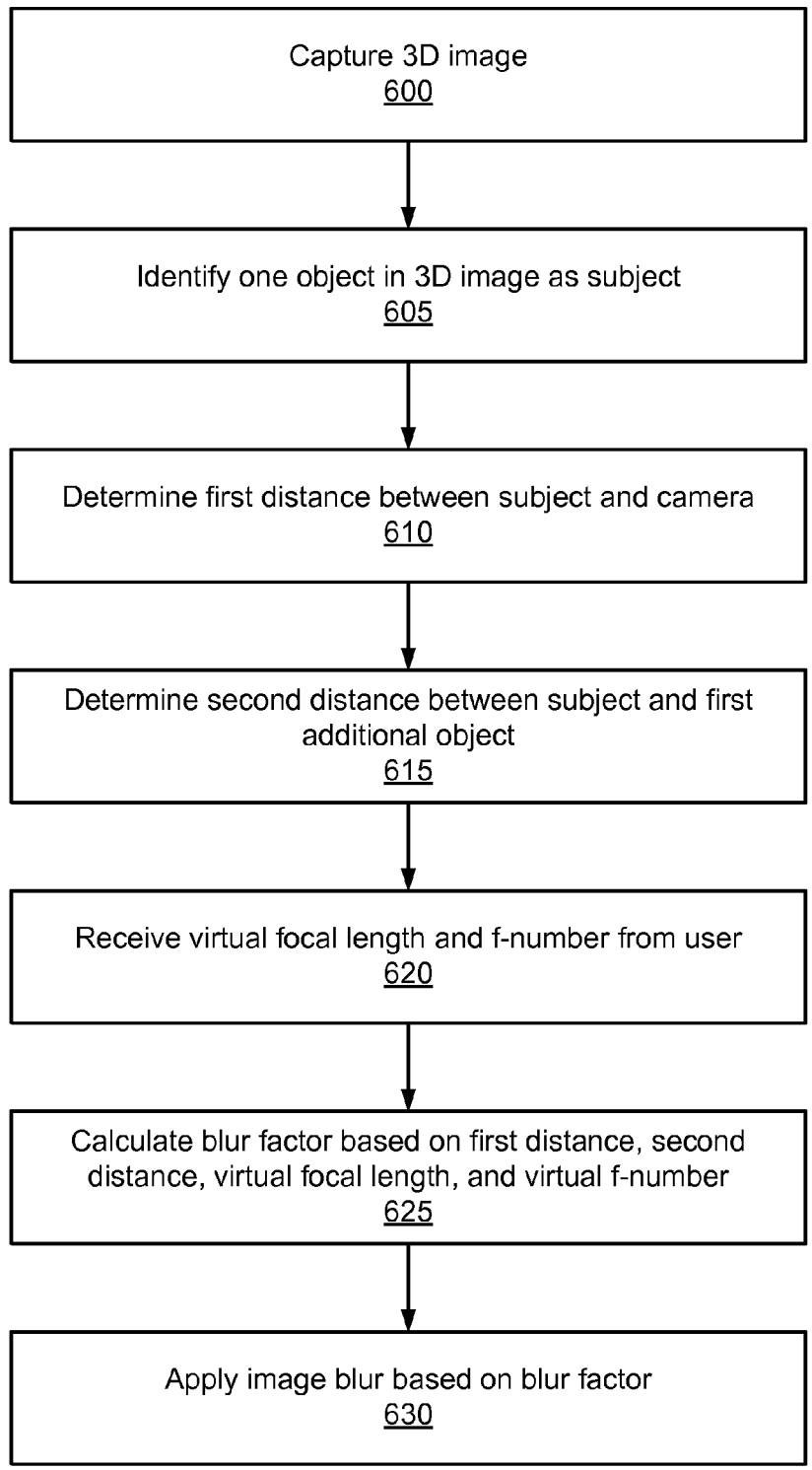
FIG. 6 is a flow chart illustrating a process for generating a blurred image based on depth information from a 3D camera, according to one embodiment.

FIG. 6 is a flow chart illustrating a process for using the cinematic blur module 230 to generate a blurred image based on depth information from a 3D camera, according to one embodiment. The process begins when a 3D camera captures 600 a 3D image that contains 3D depth information for multiple objects. As described with reference to FIGS. 1B through 1D, an example 3D camera may be embodied as two separated cameras 108A, 108B that are pointed in the same direction. In this case, the offset between an object's positions on the two image sensors 110A, 110B of the cameras represents the 3D depth information for the object.

The captured 3D image is transferred over the network 216 to the cinematic blur module 230 on the computing system 218, and the subject identification module 302 identifies 605 one of the objects in the 3D image as the subject of the image. The subject identification module 302 may use a combination of pattern recognition algorithms and user input to identify the subject of the image. After the subject identification module 302 identifies 605 the subject of the 3D image, the distance calculator 304 uses the 3D depth information in the 3D image to determine 610 a first distance (i.e., a subject distance) between the 3D camera and the subject. For the example image 100 shown in FIG. 1A, the distance calculator 304 may use the offset between the cyclist's position in the two images to calculate the subject distance 420 shown in FIG. 4.

After the distance calculator 304 determines 610 the subject distance, the layer generator 306 divides the 3D image into a series of image layers, and the distance calculator 304 determines 615 a second distance between the subject and an image layer containing a first additional object (i.e., a defocus distance for the layer). To determine the defocus distance, the distance calculator 304 first uses the 3D depth information for the first additional object to calculate the distance between the 3D camera and the first additional object (i.e., the object distance for object). Next, the distance calculator 304 subtracts the subject distance from the object distance to find the defocus distance for the layer. As a result, image layers between the 3D camera and the subject have a negative defocus distance while layers behind the subject have a positive defocus distance.

Next, the user input devices 226 of the computing system 218 receive 620 a virtual focal length and f-number from the user. The blur factor calculator 308 uses the virtual focal length and f-number in conjunction with the first distance (i.e., the subject distance) and the second distance (i.e., the defocus distance) to calculate 625 a blur factor for the image layer corresponding to the first additional object. As described with reference to FIG. 3, the blur factor determines the strength of the blur filter that is applied to the image layer.

Finally, the blur filter 310 applies 630 an image blur to the image layer based on the value of the blur factor. In one embodiment, the blur spot generator 310A generates a blur spot whose size is proportional to the blur factor, and the convolution module 310B convolves the blur spot with the image layer to generate a blurred image layer. To prevent blurred objects from obstructing objects that are further back in the image, the transparency module 310C adds a transparency to the blurred image layer either by making the blur spot transparent or by applying a transparency to the blurred image layer after the convolution.

If the cinematic blur module 230 receives a long sequence of 3D images at once (e.g., video frames of a 3D video), the process shown in FIG. 6 may be performed for a plurality of 3D images in parallel or in series. In other words, every 3D image in the sequence may be processed simultaneously, the images in the sequence may be processed one at a time, or the sequence of 3D images may be divided into several subsequences of 3D images that are processed simultaneously. In addition, the steps of determining 615 a defocus distance, calculating 625 a blur factor, and applying 625 an image blur are typically performed for multiple image layers of the 3D image to generate multiple blurred image layers. The multiple image layers of a 3D image may also be processed in parallel, in sequence, or in some combination of the two.

Additional Configuration Considerations

The disclosed embodiments beneficially allow for the generation of shallow depth-of-field images without using a traditional camera that is equipped with a large optical system. A shallow depth-of-field is desirable in many situations because the blurred background and foreground draw a viewer's attention to a single in-focus subject of the image. Normally, a camera with a large optical system and a large sensor plane is required to capture shallow depth-of-field images. However, by generating the image blur associated with the shallow depth-of-field in post-processing, the original image may be captured with any camera that is capable of capturing 3D depth information. Thus, a 3D camera with smaller optical systems and image sensors may be used.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations.

One or more hardware modules may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for applying an image blur based on 3D depth information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for applying image blur based on depth information, comprising:
   receiving a 3D image captured by a 3D camera, the 3D image comprising a plurality of objects and depth information for each of the plurality of objects;
   identifying one of the plurality of objects as a subject object;
   determining a first distance between the 3D camera and the subject object based on the depth information associated with the subject object;
   determining a second distance between the subject object and a first additional object of the plurality of objects based on the depth information associated with the first additional object and the depth information associated with the subject object;
   receiving a virtual f-number and a virtual focal length;
   calculating a first blur factor for the first additional object, the first blur factor based on the first distance, the second distance, the virtual f-number, and the virtual focal length; and
   applying a first image blur to the first additional object based on the first blur factor, wherein a magnitude of the applied first image blur is greater if the first additional object is closer to the camera than the subject object than if the subject object is closer to the camera than the first additional object.

2. The method of claim 1, wherein the 3D image comprises a first image and a second image, the first image captured by a first camera and the second image captured by a second camera, two cameras separated by a separation distance and pointed in the same direction.

3. The method of claim 2, wherein the depth information for each of the plurality of objects in the 3D image comprises an offset between the object's position in the first image and the object's position in the second image.

4. The method of claim 1, wherein the depth information for each of the plurality of objects comprises parallax information for each of the plurality of objects.

5. The method of claim 1, wherein identifying the first object of the 3D image as the subject object comprises receiving a user input identifying the first object as the subject.

6. The method of claim 1, wherein applying the first image blur to the first additional object comprises:

generating an image layer comprising an object region associated with the first additional object and a transparent region;
generating a blur spot, a size of the blur spot based on the first blur factor;
convolving the blur spot with the image layer, the convolution operation generating a blurred image layer, the blurred image layer comprising a blurred object region with a blurred first additional object and a transparent region; and
applying a transparency function to a boundary between the blurred object region and the transparent region.

7. The method of claim 1, further comprising:
determining a third distance between the subject object and a second additional object of the plurality of objects based on the depth information associated with the second additional object and the depth information associated with the subject object;
calculating a second blur factor for the second additional object, the second blur factor based on the first distance, the third distance, the virtual f-number, and the virtual focal length; and
applying a second image blur to the second additional object based on the value of the second blur factor.

8. The method of claim 7, wherein the first additional object is closer in distance to the 3D camera than the subject object, and wherein the subject object is closer in distance to the 3D camera than the second additional object.

9. A system for applying an image blur based on depth information, comprising:
a non-transitory computer-readable medium storing computer program instructions and configured to be executed by a processor, the instructions for:
receiving a 3D image from a 3D camera, the 3D image comprising a plurality of objects and depth information associated with each object;
identifying one of the plurality of objects as a subject object;
determining a first distance between the 3D camera and the subject object based on the depth information associated with the subject object;
determining a second distance between the subject object and a first additional object of the plurality of objects based on the depth information associated with the first additional object and the depth information associated with the subject object;
receiving a virtual f-number and a virtual focal length;
calculating a first blur factor for the first additional object, the first blur factor based on the first distance, the second distance, the virtual f-number, and the virtual focal length; and
applying a first image blur to the first additional object based on the first blur factor, wherein a magnitude of the applied first image blur is greater if the first additional object is closer to the camera than the subject object than if the subject object is closer to the camera than the first additional object; and
a processor configured to execute the computer program instructions.

10. The system of claim 9, wherein the 3D camera comprises a first camera and a second camera, the two cameras separated by a separation distance and pointed in the same direction, wherein each of the two cameras comprises an image sensor.

11. The system of claim 10, wherein the 3D depth information for each of the plurality of objects in the 3D image comprises an offset between the object's position relative to the image sensor of the first camera and the object's position relative to the image sensor of the second camera.

12. The system of claim 9, wherein identifying the first object of the 3D image as the subject object comprises receiving a user input identifying the first object.

13. The system of claim 9, wherein applying the first image blur to the first additional object comprises:
generating an image layer comprising an object region associated with the first additional object and a transparent region;
generating a blur spot, a size of the blur spot based on the first blur factor;
convolving the blur spot with the image layer, the convolution operation generating a blurred image layer, the blurred image layer comprising a blurred object region with a blurred first additional object and a transparent region; and
applying a transparency function to a boundary between the blurred object region and the transparent region.

14. The system of claim 9, wherein the computer-readable medium further comprises instructions for:
determining a third distance between the subject object and a second additional object of the plurality of objects based on the depth information associated with the second additional object and the depth information associated with the subject object;
calculating a second blur factor for the second additional object, the second blur factor based on the first distance, the third distance, the virtual f-number, and the virtual focal length; and
applying a second image blur to the second additional object based on the second blur factor.

15. The system of claim 14, wherein the first additional object is closer in distance to the 3D camera than the subject object, and wherein the subject object is closer in distance to the 3D camera than the second additional object.

16. A non-transitory computer-readable medium storing computer program instructions and configured to be executed by a processor, the instructions for:
receiving a 3D image captured by a 3D camera, the 3D image comprising a plurality of objects and depth information for each of the plurality of objects;
identifying one of the plurality of objects as a subject object;
determining a first distance between the 3D camera and the subject object based on the depth information associated with the subject object;
determining a second distance between the subject object and a first additional object of the plurality of objects based on the depth information associated with the first additional object and the depth information associated with the subject object;
receiving a virtual f-number and a virtual focal length;
calculating a first blur factor for the first additional object, the first blur factor based on the first distance, the second distance, the virtual f-number, and the virtual focal length; and
applying a first image blur to the first additional object based on the first blur factor,
wherein a magnitude of the applied first image blur is greater if the first additional object is closer to the camera than the subject object than if the subject object is closer to the camera than the first additional object.

17. The computer-readable medium of claim 16, wherein the 3D image comprises a first image and a second image, the first image captured by a first camera and the second image captured by a second camera, two cameras separated by a separation distance and pointed in the same direction.

18. The computer-readable medium of claim 17, wherein the depth information for each of the plurality of objects in the 3D image comprises an offset between the object's position in the first image and the object's position in the second image.

19. The computer-readable medium of claim 16, wherein identifying the first object of the 3D image as the subject object comprises receiving a user input identifying the first object as the subject.

20. The computer-readable medium of claim 16, wherein applying the first image blur to the first additional object comprises:
   generating an image layer comprising an object region associated with the first additional object and a transparent region;
   generating a blur spot, a size of the blur spot based on the first blur factor;
   convolving the blur spot with the image layer, the convolution operation generating a blurred image layer, the blurred image layer comprising a blurred object region with a blurred first additional object and a transparent region; and
   applying a transparency function to a boundary between the blurred object region and the transparent region.

21. The computer-readable medium of claim 16, further comprising instructions for:
   determining a third distance between the subject object and a second additional object of the plurality of objects based on the depth information associated with the second additional object and the depth information associated with the subject object;
   calculating a second blur factor for the second additional object, the second blur factor based on the first distance, the third distance, the virtual f-number, and the virtual focal length; and
   applying a second image blur to the second additional object based on the value of the second blur factor.

22. The computer-readable medium of claim 21, wherein the first additional object is closer in distance to the 3D camera than the subject object, and wherein the subject object is closer in distance to the 3D camera than the second additional object.

23. A method for applying image blur based on depth information, comprising:
   receiving an image taken by a camera, the image comprising a plurality of objects;
   identifying one of the plurality of objects as a subject object;
   determining a first distance between the camera and the subject object;
   determining a second distance between the subject object and a first additional object of the plurality of objects;
   receiving an f-number and a focal length; and
   applying a first image blur to the first additional object based on the first distance, the second distance, the f-number, and the focal length, wherein a magnitude of the applied first image blur is greater if the first additional object is closer to the camera than the subject object than if the subject object is closer to the camera than the first additional object.

* * * * *